3,272,844
NOVEL ACETYLENIC AMIDES
Nelson R. Easton and Robert D. Dillard, both of Indianapolis, Ind., assignors to Eli Lilly and Company, Indianapolis, Ind., a corporation of Indiana
No Drawing. Filed June 3, 1965, Ser. No. 461,197
6 Claims. (Cl. 260—347.3)

This invention relates to certain acetylenic amides, and more particularly to certain novel acetylenic amides useful in the treatment of hypertension and having additional utility in the field of plant physiology as herbicides.

The compounds provided by this invention can be represented by the following formula:

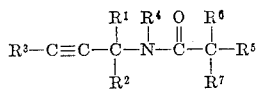

wherein
$R^1$ and $R^2$, when taken alone, are lower alkyl, phenyl, or substituted phenyl containing no more than two substituents, the substituents being methyl, trifluoromethyl, halo, or methoxy;
$R^1$ and $R^2$, when taken together with the carbon atom to which they are attached, complete a $C_5$–$C_8$ cycloalkyl ring;
$R^3$ is hydrogen, lower alkyl, halo, phenyl, or naphthyl;
$R^4$ is hydrogen, lower alkyl, $C_3$–$C_6$ cycloalkyl, loweralkoxy-lower alkyl, or tetrahydrofurfuryl;
$R^5$ is phenoxy, mono- or di-substituted phenoxy, phenyl-thio, mono- or di-substituted phenylthio, naphthyloxy, mono- or di-substituted naphthyloxy, naphthylthio, or mono- or di-substituted naphthylthio, the substituents being methyl, trifluoromethyl, or halo; and
$R^6$ and $R^7$ are hydrogen, methyl, or ethyl.

"Lower alkyl" as used herein refers to methyl, ethyl, n-propyl, isopropyl, n-butyl, isobutyl, sec.-butyl, or tert.-butyl.

"Lower alkoxy" refers to the lower-alkyl groups above, attached at any available position of the defined lower-alkyl group through an intervening oxygen atom. They may include illustratively methoxy, ethyoxy, n-propoxy, isopropoxy, n-butoxy, isobutoxy, sec.-butoxy, and tert.-butoxy.

"Halo" refers to fluoro, chloro, bromo, and iodo.

"$C_3$–$C_6$ cycloalkyl" refers to cyclopropyl, cyclobutyl, cyclopentyl, and cyclohexyl;

"$C_5$–$C_8$ cycloalkyl" refers to cyclopentyl, cyclohexyl, cycloheptyl, and cyclooctyl.

Representative compounds provided by this invention include:
3-methyl-3-phenoxyacetamido-1-heptyne
3-isopropyl-4-methyl-3-(p-chlorophenoxyacetamido)-1-pentyne
1-chloro-3-sec.-butyl-4,4-dimethyl-3-(m-trifluoromethylphenoxyacetamido)-1-pentyne
3-ethyl-4,4-dimethyl-3-(o-methylphenoxyacetamido)-1-pentyne
1-phenyl-3-methyl-3-(3,4-dimethylphenoxyacetamido)-1-pentyne
1-(1-naphthyl)-3-methyl-3-(3-chloro-4-methylphenoxyacetamido)-1-pentyne
2-methyl-2-(3,4-bis(trifluoromethyl)phenoxyacetamido)-3-hexyne
3,6,8-trimethyl-6-phenoxyacetamido-4-nonyne
6-methyl-6-(N-methyl-2-methyl-5-trifluoromethylphenoxyacetamido)-4-heptyne
1-phenyl-3-ethyl-3-(N-cyclohexyl-2-chlorophenoxyacetamido)-1-pentyne
1-(2-naphthyl)-3-ethyl-3-(N-ethoxyethyl-3-methylphenoxyacetamido)-1-hexyne
3-sec.-butyl-3-[N-(2-tert.-butoxy-n-propyl)-3-methylphenoxyacetamido]-1-hexyne
3-isobutyl-3-[N-(4-methoxybutyl)-3-bromophenylthioacetamido]-1-heptyne
3-methyl-3-[N-methyl-2-(4-bromophenoxy)propionamido]-1-butyne
3-methyl-3-[N-(4-methoxybutyl)-2-(3-iodophenylthio)butyramido]-1-pentyne
N-(1-ethynylcyclohexyl)-N-methyl-2-ethyl-2-(4-fluorophenoxy)butyramide
N-(1-ethynylcyclopentyl)-N-(2-methoxy-sec.-butyl)-2-[2,6-bis(trifluoromethyl)-1-napthyloxy]isobutyramide
N-(1-hexynylcyclooctyl)-N-tetrahydrofurfuryl-2-ethyl-2-(3,4-dimethyl-2-naphthylthio)butyramide The compounds provided by the inventions are prepared from readily available phenoxyacetic acids and acetylenic amines, made available by the procedures of G. F. Hennion and E. G. Teach, J. Am. Chem. Soc., 75, 1653–4 (1953), and of N. R. Easton et al., J. Org. Chem., 27, 2746 (1962). Typical methods for the preparation of amides can be employed, as by preparing the acid chloride by treatment of the acid with thionyl chloride or phosphorus trichloride and subsequent treatment of the acid chloride with the appropriately substituted amine in an inert solvent. Alternatively, the acid and amine can be treated with dicyclohexylcarbodiimide or the like, to cause formation of the amide; or a mixed anhydride can be prepared from the acid and such compounds as isobutyl chlorocarbonate, then reacted with the appropriate amine to form the desired product.

The following examples are illustrative of the procedure available for their preparation and are not meant to limit the scope of the invention.

*Example 1*

A solution of 61.5 g. of 1-ethynylcyclohexylamine and 101 g. of triethylamine in 1000 ml. of chloroform was cooled to 2° C. With stirring, and external cooling to maintain the internal temperature, a solution of 85.3 g. of phenoxyacetyl chloride in 50 ml. of chloroform was added dropwise. The mixture was allowed to warm to room temperature, stirred for an additional 18 hours, washed with one liter of water, evaporated in vacuo, and the resulting product recrystallized from benzene-petroleum ether (boiling range, 60–90° C.). Yield: 78.0 g. of N-(1-ethynylcyclohexyl)phenoxyacetamide; melting point, 81–83° C. *Analysis.*—Calcd. for $C_{16}H_{19}NO_2$: C, 74.68; H, 7.44. Found: C, 74.93; H, 7.44.

*Example 2*

A solution of 22.2 g. of 4-methylamino-4-methyl-2-pentyne and 40.4 ml. of triethylamine in 500 ml. of chloroform was treated dropwise while stirring at 5° C. with 41 g. of p-chlorophenoxyacetyl chloride. The mixture was allowed to warm to room temperature and was stirred for 18 hours. One liter of 0.5 N sodium hydroxide was added, the layers separated, and the chloroform layer dried and evaporated in vacuo. The resulting residue was recrystallized from methylcyclohexane, yielding 21.0 g. of 4-methyl-4-(N-methyl-p-chlorophenoxyacetamido)-2-pentyne; melting point, 46–48° C. *Analysis.*—Calcd. for $C_{15}H_{18}NO_2Cl$: C, 64.39; H, 6.48. Found: C, 64.29; H, 6.66.

In addition to the above compound, the following are several other examples of compounds prepared by the same procedure:

3-methyl-3-phenoxyacetamido-1-butyne. Melting point, 103–105° C. *Analysis.*—Calcd. for $C_{13}H_{15}NO_2$: C, 71.86; H, 6.95. Found: C, 71.99; H, 7.11.

3-methyl-3-(p-chlorophenoxyacetamido)-1-butyne. Melting point, 96–98° C. *Analysis.*—Calcd. for $C_{13}H_{14}NO_2Cl$ C, 62.03; H, 5.60. Found: C, 62.20; H, 5.88.

N-(1-ethynylcyclohexyl)-p-chlorophenoxyacetamide. Melting point, 99–101° C. *Analysis.*—Calcd. for $C_{16}H_{18}NO_2Cl$ C, 65.86; H, 6.21. Found: C, 65.83; H, 6.39.

3-methyl-3-(2,4-dichlorophenoxyacetamido)-1-butyne. Melting point, 80–82° C. *Analysis.*—Calcd. for $C_{13}H_{13}NO_2Cl_2$ C, 54.56; H, 4.57. Found: C, 54.62; H, 4.68.

N-(1-ethynylcyclohexyl)-N-methyl-2,4-dichlorophenoxyacetamide. Melting point, 70–72° C. *Analysis.*—Calcd. for $C_{17}H_{19}NO_2Cl_2$: C, 60.01; H, 5.62. Found: C, 60.25; H, 5.84.

N-(1-ethynylcyclohexyl)-2,4-dichlorophenoxyacetamide. Melting point, 111–113° C. *Analysis.*—Calcd. for $C_{16}H_{17}NO_2Cl_2$: C, 58.90; H, 5.25. Found: C, 59.05, H, 5.41.

4-methyl-4-(N-methyl-2,4-dichlorophenoxyacetamido)-2-pentyne. Melting point, 41–43° C. *Analysis.*—Calcd. for $C_{15}H_{17}NO_2Cl_2$: C, 57.33; H, 5.45. Found: C, 57.04; H, 5.68.

N-(1-ethynylcyclohexyl)-N-methyl-3,4-dichlorophenoxyacetamide. Melting point, 129–131° C. *Analysis*—Calcd. for $C_{17}H_{19}NO_2Cl_2$: C, 60.01; H, 5.62. Found: C, 60.01; H, 5.78.

N-(1-ethynylcyclohexyl)-3,4-dichlorophenoxyacetamide. Melting point, 113–115° C. *Analysis.*—Calcd. for $C_{16}H_{17}NO_2Cl_2$: C, 58.90; H, 5.25. Found: C, 59.00; H, 5.42.

3-methyl-3-(N-methyl-3,4-dichlorophenoxyacetamido)-1-butyne. Melting point, 85–87° C. *Analysis.*—Calcd. for $C_{14}H_{15}NO_2Cl_2$: C, 56.01; H, 5.03. Found: C, 56.12; H, 5.12.

3-methyl-3-(N-methyl-p-chlorophenoxyacetamido)-1-butyne. Melting point, 68–70° C. *Analysis.*—Calcd. for $C_{14}H_{16}NO_2Cl$: C, 63.27; H, 6.06. Found: C, 63.17; H, 6.19.

3-methyl-3-(m-bromophenoxyacetamido)-1-butyne. Melting point, 95–97° C. *Analysis.*—Calcd. for $C_{13}H_{14}NO_2Br$ C, 52.72; H, 4.76. Found: C, 52.94; H, 4.85.

N-(ethynylcyclohexyl)-p-bromophenoxyacetamide. Melting point, 128–130° C. *Analysis.*—Calcd. for $C_{16}H_{18}NO_2Br$ C, 57.15; H, 5.39. Found: C, 56.97; H, 5.44.

3-methyl-3-[N-(2-tetrahydrofurfuryl)-p-chlorophenoxyacetamido]-1-butyne. Melting point, 104–106° C. *Analysis.*—Calcd. for $C_{18}H_{22}NO_3Cl$: C, 64.37; H, 6.60. Found: C, 64.36; H, 6.51.

3-methyl-3-(p-bromophenoxyacetamido)-1-butyne. Melting point, 96–98° C. *Analysis.*—Calcd. for $C_{13}H_{14}NO_2Br$ C, 52.72; H, 4.76. Found: C, 52.72; H, 4.91.

3-methyl-3-(2-trifluoromethylphenylthioacetamido)-1-butyne. Melting point, 88–90° C. *Analysis.*—Calcd. for $C_{14}H_{14}NOSF_3$: C, 55.80; H, 4.68. Found: C, 56.07; H, 4.74.

3-methyl-3-(2-methyl-3-chlorophenylthioacetamido)-1-butyne. Melting point, 106–109° C. *Analysis.*—Calcd. for $C_{14}H_{16}NOClS$: C, 59.67; H, 5.72. Found: C, 59.43; H, 5.86.

3-methyl-3-(2-methylphenylthioacetamido)-1-butyne. Melting point, 86–88° C. *Analysis.*—Calcd. for $C_{14}H_{17}NOS$ C, 67.97; H, 6.92. Found: C, 68.20; H, 7.06.

3-methyl-3-(p-chlorophenylthioacetamido)-1-butyne. Melting point, 93–95° C. *Analysis.*—Calcd. for $C_{13}H_{14}NOClS$ C, 58.31; H, 5.26. Found: C, 58.14; H, 5.38.

N-ethynylcyclohexyl-p-fluorophenoxyacetamide. Melting point, 83–85° C. *Analysis.*—Calcd. for $C_{16}H_{18}NO_2F$: C, 69.80; H, 5.48. Found: C, 70.03; H, 6.67.

3-methyl-3-(3,4-dichlorophenoxyacetamido)-1-butyne. Melting point, 92–94° C. *Analysis.*—Calcd. for $C_{13}H_{13}NO_2Cl_2$ C, 54.56; H, 4.57. Found: C, 54.44; H, 4.65.

3-methyl-3-(N-cyclopropyl-p-chlorophenoxyacetamido)-1-butyne. Melting point, 72–74° C. *Analysis.*—Calcd. for $C_{16}H_{18}NO_2Cl$: C, 65.86; H, 6.21. Found: C, 65.74; H, 6.42.

3-methyl-3-(m-chlorophenoxyacetamido)-1-butyne. Melting point, 107–108° C. *Analysis.*—Calcd. for $C_{13}H_{14}NO_2Cl$ C, 62.03; H, 5.60. Found: C, 62.01; H, 5.89.

3-methyl-3-(o-chlorophenoxyacetamido)-1-butyne. Melting point, 104–106° C. *Analysis.*—Calcd. for $C_{13}H_{14}NO_2Cl$ C, 62.03; H, 5.60. Found: C, 61.51; H, 5.75.

3-methyl-3-(N-methyl-2,4-dichlorophenoxyacetamido)-1-butyne. Melting point, 74–76° C. *Analysis.*—Calcd. for $C_{14}H_{15}NO_2Cl_2$: C, 56.01; H, 5.03. Found: C, 56.21; H, 5.21.

3-methyl-3-[N-(2-tetrahydrofurfuryl)-2,4-dichlorophenoxyacetamido]-1-butyne. Melting point, 106–108° C. *Analysis.*—Calcd. for $C_{18}H_{21}NO_3Cl_2$: C, 58.38; H, 5.71. Found: C, 58.57; H, 5.92.

3-methyl-3-(p-trifluoromethylphenoxyacetamido)-1-butyne. Melting point, 91–93° C. *Analysis.*—Calcd. for $C_{14}H_{14}NO_2F_3$: C, 58.94; H, 4.94. Found: C, 59.90; H, 5.46.

3,4,4-trimethyl-3-(N-methyl-3,4-dichlorophenoxyacetamido)1-pentyne. Melting point, 120–123° C. *Analysis.*—Calcd. for $C_{17}H_{21}NO_2Cl_2$: C, 59.65; H, 6.19. Found: C, 59.47; H, 7.35.

3-phenyl-3-(2,4-dichlorophenoxyacetamido)-1-butyne. Melting point, 150–152° C. *Analysis.*—Calcd. for $C_{18}H_{15}NO_2Cl_2$ C, 62.08; H, 4.34. Found: C, 62.36; H, 4.46.

The compounds of the present invention are hypotensives, as is demonstrated by the data in the following table, obtained in a standard test performed on laboratory animals by the method of Goldblatt et al., J. Exp. Med., 59, 347 (1934). In the Goldblatt et al. test, the Wistar strain of rat, as prepared by the method of the reference, is given a measured dose of the test compound by gavage, and the mean and maximum fall in blood pressure ("B.P.") produced by the compound over a seven-hour test period is measured and recorded.

| Compound | Dose, mg./kg. body weight | Mean B.P. fall (percent) | Maximum B.P. fall (percent) | Time at which max. fall occurred (hours) |
|---|---|---|---|---|
| 3-methyl-3-[N-methyl-(p-chlorophenoxy)acetamido]-1-butyne | 20 | 4.56 | 8.42 | 6–7 |
| 4-methyl-4-[N-methyl-(p-chlorophenoxy)acetamido]-2-pentyne | 100 | 6.37 | 8.87 | 3 |
| 3-methyl-3-(2,4-dichlorophenoxyacetamido)-1-butyne | 20 | 6.76 | 9.60 | 5 |
| 3-methyl-3-(3,4-dichlorophenoxyacetamido)-1-butyne | 40 | 10.45 | 13.20 | 2 |
| 3-methyl-3-(p-fluorophenoxyacetamido)-1-butyne | 20 | 3.94 | 6.01 | 5 |
| 3-methyl-3-(o-trifluoromethylphenylthioacetamido)-1-butyne | 20 | 6.79 | 11.06 | 2 |
| 3-methyl-3-(p-chlorophenylthioacetamido)-1-butyne | 40 | 9.33 | 13.74 | 5 |
| N-(1-ethynylcyclohexyl)-p-bromophenoxyacetamide | 20 | 6.43 | 11.22 | 5 |
| 3-methyl-3-[N-(2-tetrahydrofurfuryl)-2,4-dichlorophenoxyacetamido]-1-butyne | 20 | 6.76 | 9.60 | 5 |
| 3-methyl-3-[N-(2-tetrahydrofurfuryl)-p-chlorophenoxyacetamido]-1-butyne | 40 | 6.85 | 15.14 | 5 |

The compounds of the invention can also be used to prevent the growth of unwanted vegetation in lawns, gardens, farmlands, and the like. An emulsion of compound of from 2 to 20 percent by weight in an appropriate water-miscible base can be applied directly to the ground by spraying, or alternatively an inert base such as vermiculite or corn cobs can be impregnated with the compound and then spread evenly over the area to be treated. In all cases, the area should be covered with about 2 pounds to about 40 pounds per acre.

We claim:

1. A compound of the formula

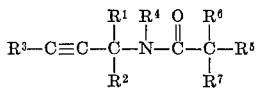

wherein $R^1$ and $R^2$, when taken alone, are members of the group consisting of lower alkyl, phenyl, and phenyl bearing not more than two substituents selected from the group consisting of methyl, trifluoromethyl, halo, and methoxy;

$R^1$ and $R^2$, when taken together with the carbon atom to which they are attached, complete a $C_5$–$C_8$ cycloalkyl ring;

$R^3$ is a member of the group consisting of hydrogen, lower alkyl, halo, phenyl, and naphthyl;

$R^4$ is a member of the group consisting of hydrogen, lower alkyl, $C_3$–$C_6$ cycloalkyl, lower-alkoxy-lower alkyl, and tetrahydrofurfuryl;

$R^5$ is a member of the group consisting of phenoxy, monosubstituted phenoxy, disubstituted phenoxy, phenylthio, monosubstituted phenylthio, disubstituted phenylthio, naphthyloxy, monosubstituted naphthyloxy, disubstituted naphthyloxy, naphthylthio, monosubstituted naphthylthio, disubstituted naphthylthio, the substituents being from the group consisting of methyl, trifluoromethyl, and halo;

$R^6$ and $R^7$ are members of the group consisting of hydrogen, methyl and ethyl.

2. 3 - methyl - 3 - (2,4 - dichlorophenoxyacetamido)-1-butyne.

3. N - (1-ethynylcyclohexyl)-2,4-dichlorophenoxyacetamide.

4. N - (1 - ethynylcyclohexyl) - N-methyl-3,4-dichlorophenoxyacetamide.

5. 3 - methyl - 3 - (N-methyl-3,4-dichlorophenoxyacetamido)-1-butyne.

6. 3 - methyl - 3 - [N-(2-tetrahydrofurfuryl)-p-chlorophenoxyacetamido]-1-butyne.

No references cited.

ALEX MAZEL, *Primary Examiner.*

HENRY R. JILES, *Examiner.*

JAMES H. TURNIPSEED, *Assistant Examiner.*